United States Patent
Qiu et al.

(10) Patent No.: US 9,519,094 B2
(45) Date of Patent: Dec. 13, 2016

(54) BACKLIGHT MODULE AND THE LIQUID CRYSTAL DISPLAY

(71) Applicant: Shenzhen China Star Optoelectronics Technology Co., Ltd., Shenzhen, Guangdong (CN)

(72) Inventors: Yongyuan Qiu, Shenzhen (CN); Yong Fan, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 156 days.

(21) Appl. No.: 13/980,064

(22) PCT Filed: Jun. 27, 2013

(86) PCT No.: PCT/CN2013/078183
§ 371 (c)(1),
(2) Date: Jul. 17, 2013

(87) PCT Pub. No.: WO2014/187009
PCT Pub. Date: Nov. 27, 2014

(65) Prior Publication Data
US 2014/0347605 A1    Nov. 27, 2014

(30) Foreign Application Priority Data
May 23, 2013   (CN) .......................... 2013 1 0195151

(51) Int. Cl.
G02F 1/1335    (2006.01)
F21V 8/00      (2006.01)
G02B 6/26      (2006.01)

(52) U.S. Cl.
CPC ........... *G02B 6/0028* (2013.01); *G02B 6/0008* (2013.01); *G02B 6/262* (2013.01)

(58) Field of Classification Search
CPC ... G02B 6/0021; G02B 6/0028; G02B 6/0066; G02B 6/262
See application file for complete search history.

(56) References Cited

U.S. PATENT DOCUMENTS

| | | | | |
|---|---|---|---|---|
| 5,653,034 A | * | 8/1997 | Bindon | 42/131 |
| 2002/0031300 A1 | * | 3/2002 | Jie et al. | 385/33 |
| 2011/0044584 A1 | * | 2/2011 | Helstern | 385/56 |

FOREIGN PATENT DOCUMENTS

| | | |
|---|---|---|
| CN | 1479126 A | 3/2004 |
| CN | 202133802 U | 2/2012 |

(Continued)

*Primary Examiner* — Nathanael R Briggs
(74) *Attorney, Agent, or Firm* — Andrew C. Cheng

(57) ABSTRACT

A backlight module is disclosed. The backlight module includes an ambient light collector for collecting ambient lights, at least one optical fiber connecting to the ambient light collector, a light emitting plate arranged closely to an optical plate, at least one fixing sleeve being received in the through hole, and at least one optical fiber sleeve. The light emitting plate includes a plurality of through holes. The optical fiber sleeve is fixed within the fixing sleeve and engages with the light emitting ends of the optical fibers to fix the optical fibers on the light emitting plate. The backlight module utilizes the ambient lights as light source. In addition, by cutting the light emitting end of the optical fibers, the light emitting angle of the lights are greatly enlarged. As such, the brightness difference is decreased and the display performance is enhanced.

16 Claims, 9 Drawing Sheets

(56) References Cited

FOREIGN PATENT DOCUMENTS

| CN | 102494297 A | * | 6/2012 | ............ F21S 19/00 |
| CN | 102966911 A | | 3/2013 | |

* cited by examiner

BACKLIGHT MODULE AND THE LIQUID CRYSTAL DISPLAY

BACKGROUND OF THE INVENTION

1. Field of the Invention

The present disclosure relates to liquid crystal display technology, and more particularly to a backlight module and a liquid crystal display (LCD).

2. Discussion of the Related Art

Nowadays, LED and CCFL are adopted as backlight sources, in particular, LED is widely adopted due to the energy-efficient advantage. As the environmental protection arise recently, it is necessary to decrease the number of the light sources so as to reduce the power consumption. Alternatively, new energy-efficient light sources have to be developed.

One new option of the light source is ambient light, such as sun rays, which has not to be driven by the electrical power. Another solution is to decrease the ratio of the original light source, such as LED, by adopting the ambient light at the same time. Currently, the ambient lights are collected and then transmitted from a plurality of optical fibers toward the backlight module. However, the light emitting angles of the light rays emitted from the light emitting ends of the optical fibers are small, and which results in brightness difference. For example, it is even possible to distinguish the locations of the optical fibers from the brightness difference. As such, the optical performance of the backlight module is seriously affected.

SUMMARY

In one aspect, a backlight module includes: an ambient light collector for collecting ambient lights; at least one optical fiber connecting to the ambient light collector, and light emitting ends of the optical fiber are cut to enlarge light emitting angles; a light emitting plate arranged closely to an optical plate, and the light emitting plate includes a plurality of through holes; at least one fixing sleeve being received in the through hole; and at least one optical fiber sleeve being fixed within the fixing sleeve and engaging with the light emitting ends of the optical fibers so as to fix the optical fibers on the light emitting plate.

Wherein an outer wall of the fixing sleeve engages with the through holes by welding.

Wherein an outer wall of the fixing sleeve engages with the through holes by adhesive.

Wherein the optical fiber sleeve includes a sleeve portion and an engaging portion, the engaging portion engages with the light emitting end of the optical fiber, and the sleeve portion is attached on the optical fibers.

Wherein the sleeve portion is attached on the optical fibers by adhesive.

Wherein an inner surface of the fixing sleeve includes internal thread, and an outer surface of the sleeve portion includes outside thread, the fixing sleeve engages with the sleeve portion by the internal thread and the outside thread so as to fix the fixing sleeve and the sleeve portion of the optical fiber sleeve.

Wherein the light emitting end of the optical fiber is wedge-shaped.

Wherein the light emitting end of the optical fiber is truncated conical-shape.

Wherein the optical plate is a light guiding plate.

Wherein the optical plate is a diffusion plate.

In another aspect, a liquid crystal display includes: a backlight module and a liquid crystal panel opposite to the backlight module, and the backlight module provides a light source to the liquid crystal panel. The backlight module includes: an ambient light collector for collecting ambient lights; at least one optical fiber connecting to the ambient light collector, and light emitting ends of the optical fiber are cut to enlarge light emitting angles; a light emitting plate arranged closely to an optical plate, and the light emitting plate includes a plurality of through holes; at least one fixing sleeve being received in the through hole; and at least one optical fiber sleeve being fixed within the fixing sleeve and engaging with the light emitting ends of the optical fibers so as to fix the optical fibers on the light emitting plate.

Wherein an outer wall of the fixing sleeve engages with the through holes by welding.

Wherein an outer wall of the fixing sleeve engages with the through holes by adhesive.

Wherein the optical fiber sleeve includes a sleeve portion and an engaging portion, the engaging portion engages with the light emitting end of the optical fiber, and the sleeve portion is attached on the optical fibers.

Wherein the sleeve portion is attached on the optical fibers by adhesive.

Wherein an inner surface of the fixing sleeve includes internal thread, and an outer surface of the sleeve portion includes outside thread, the fixing sleeve engages with the sleeve portion by the internal thread and the outside thread so as to fix the fixing sleeve and the sleeve portion of the optical fiber sleeve.

Wherein the light emitting end of the optical fiber is wedge-shaped.

Wherein the light emitting end of the optical fiber is truncated conical-shape.

Wherein the optical plate is a light guiding plate.

Wherein the optical plate is a diffusion plate.

The backlight module and the liquid crystal display of the invention utilize the ambient light as the light source. In addition, by cutting the light emitting end of the optical fibers, the light emitting angles of the light rays emitted from the light emitting ends are greatly enlarged. As such, the brightness difference is decreased and the display performance is enhanced.

BRIEF DESCRIPTION OF THE DRAWINGS

FIG. 3b is a right view of the shaped optical fibers of FIG. 3a.

FIG. 5b is a right view of the shaped optical fibers of FIG. 5a.

FIG. 6 is a schematic view illustrating the simulation of the light emitting angle of the optical fibers of FIG. 5a.

FIG. 7a is a schematic view of the optical fiber sleeve of the wedge-shaped light emitting end of the optical fiber of FIG. 3a.

FIG. 7b is a right view of the optical fiber sleeve of FIG. 7a.

FIG. 8 is an assembled view of the optical fiber sleeve of FIG. 7a and the shaped optical fiber of FIG. 3a.

FIG. 9b is a right view of the optical fiber sleeve of FIG. 9a.

FIG. 10 is an assembled view of the fiber sleeve of FIG. 9a and the shaped optical fiber of FIG. 5a.

DETAILED DESCRIPTION OF THE EMBODIMENTS

Embodiments of the invention will now be described more fully hereinafter with reference to the accompanying drawings, in which embodiments of the invention are shown.

In one embodiment, the backlight module includes an ambient light collector, at least one optical fiber, at least one optical fiber sleeve, a light emitting plate, at least one fixing sleeve, and an optical plate.

Figure 1:
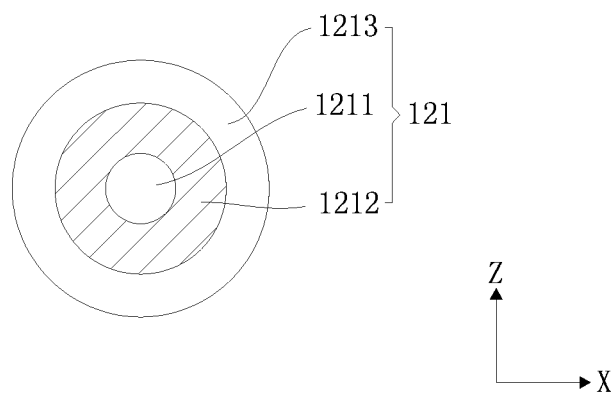
FIG. 1 is a schematic view of the optical fiber in accordance with one embodiment.

FIG. 1 is a schematic view of the optical fiber in accordance with one embodiment. As shown, the optical fiber 121 is cylinder-shaped. The optical fiber 121 includes a core 1211, a clad layer 1212, and a coating layer 1213. The core of the optical fiber 121 includes the core 1211 and the clad layer 1212 cooperatively forming a dielectric optical waveguide so as to transmit the light rays. The core 1211 may made by quartz or PMMA. The coating layer 1213 is a polymer coating layer for preventing the core 1211 and the clad layer 1212 from being damaged. The coating layer 1213 may be made by Polytetrafluoroethene (PTFE).

Figure 2:
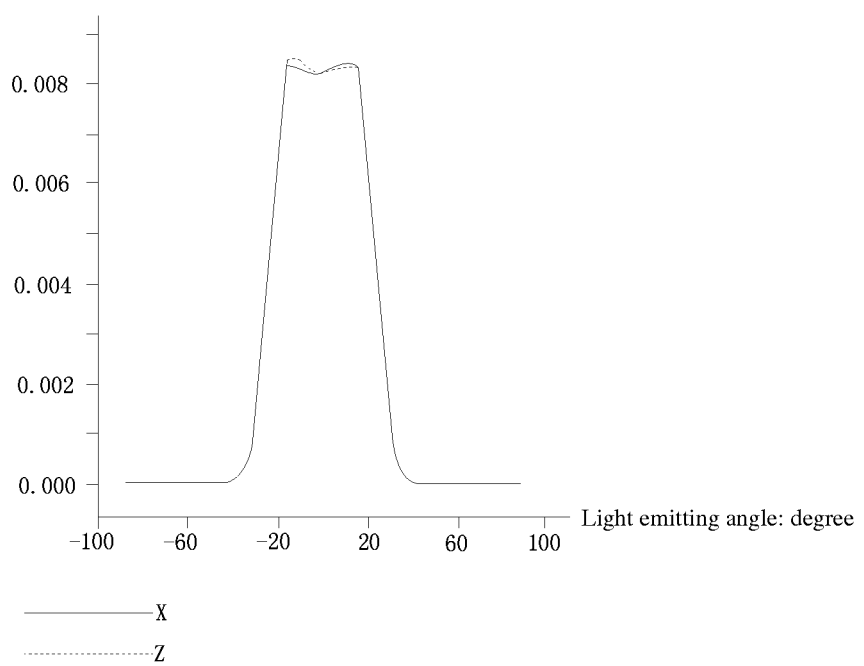
FIG. 2 is a schematic view illustrating the simulation of the light emitting angle of the optical fibers in accordance with one embodiment.

Usually, the light emitting angle of the light rays emitted from the optical fiber 121 is small. Here, the core 1211 is made by quartz and the simulation software "Light Tools" are taken as an example to illustrate. The sun rays enters the optical fiber 121 with the wavelength of the range between 380 nm to 760 nm. The diameter of the core 1211 is 1 mm, the reflective rate of the core 1211 ($n_o$) equals to 1.467, and the reflective rate of the clad layer 1212 ($n_c$) equals to 1.419. FIG. 2 is a schematic view illustrating the simulation of the light emitting angle of the optical fibers in accordance with one embodiment. The x-axis represents the light emitting angle of the optical fiber 121 in degrees. The y-axis represents the brightness of the light rays emitted from the optical fiber 121 in units of nit. The solid line indicates the light rays emitted from the optical fiber 121 in the X-direction, and the dashed line indicates the light rays emitted from the optical fiber 121 in the Z-direction.

Figure 3A:
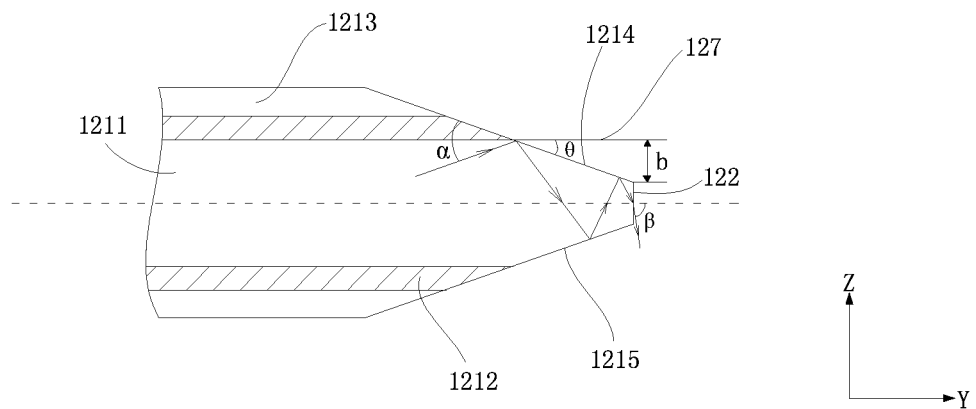
FIG. 3a is a schematic view showing the shaped optical fiber in accordance with one embodiment.
Figure 3B:
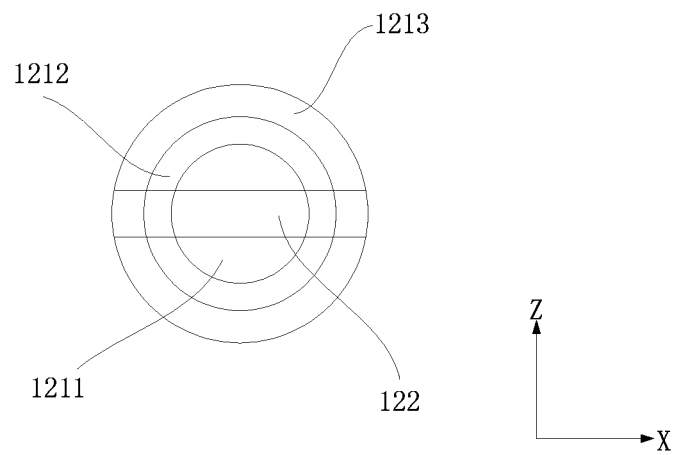
Figure 5A:
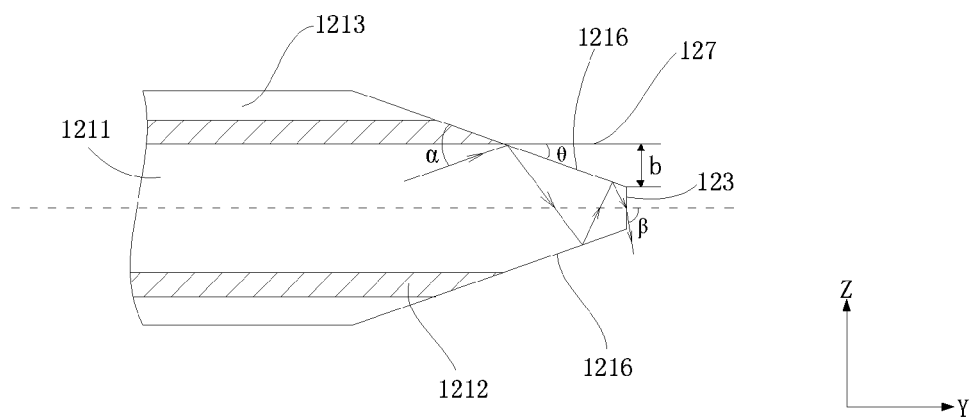
FIG. 5a is a schematic view showing another shaped optical fibers in accordance with one embodiment.
Figure 5B:
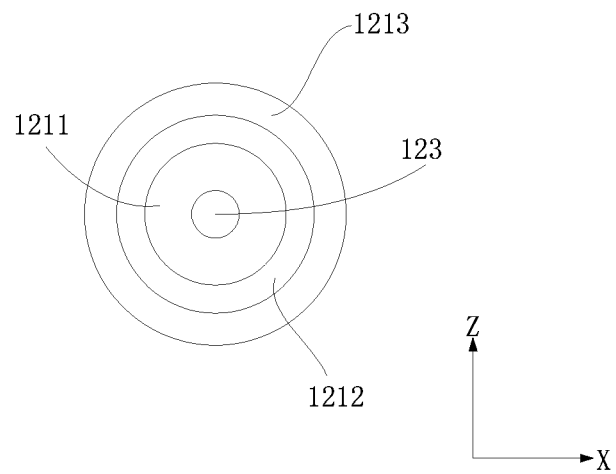

As shown, the lights emitted angle of the optical fiber 121 in the X-direction is approximately 60 degrees, and the lights emitted angle of the optical fiber 121 in the Z-direction is approximately 60 degrees. As the light emitting angle is small and may result in brightness difference, the optical fiber 121 has to be shaped to increase the light emitting angle. FIGS. 3a and 3b show the shaped optical fiber 121 in accordance with one embodiment. FIGS. 5a and 5b show another shaped optical fiber 121 in accordance with one embodiment.

As shown in FIGS. 3a and 3b, the optical fiber 121 is cut such that a light emitting end of the light emitting surface 122 is wedge-shaped. Preferably, the wedge-shaped light emitting end includes two slope 1214, 1215 that are symmetrical to each other with respect to a central axis of the optical fiber 121, which is shown by the dashed line. As shown in FIG. 3b, the light emitting surface 122 of the optical fiber 121 is quasi-rectangular. Two short sides of the light emitting surface 122 are arc-shaped.

In addition, the light emitting angle of the light emitting surface 122 of the optical fiber 121 satisfies the equation below.

$$\beta = (2n+1)\theta + \alpha;$$

wherein β indicates the light emitting angle of the light emitting surface 122 of the optical fiber 121, θ indicates the angle between the slope 1214 and a horizontal plane 127 of the optical fiber 121, α indicates the angle between the slope 1213 and the direction of an incidence light ray upon the wedge-shaped light emitting end, and n indicates the number of perfect reflection of the incidence light ray upon the slop 1214.

Figure 4:
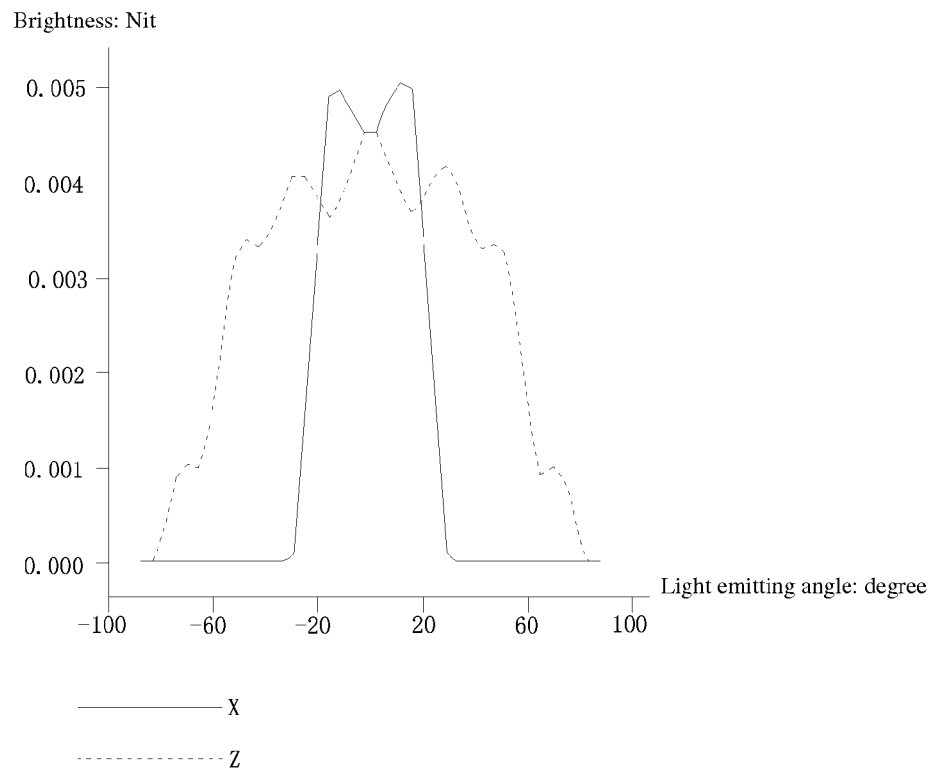
FIG. 4 is a schematic view illustrating the simulation of the light emitting angle of the optical fibers of FIG. 3.

The shaped optical fiber 121 is also simulated by the LightTools. Similarly, the sun rays with the wavelength of the range between 380 nm to 760 nm enter the optical fiber 121. The diameter of the core 1211 is 1 mm, the reflective rate of the core 1211 ($n_o$) equals to 1.467, and the reflective rate of the clad layer 1212 ($n_c$) equals to 1.419. FIG. 4 is a schematic view illustrating the simulation of the light emitting angle of the optical fibers of FIG. 3a. Similarly, the x-axis represents the light emitting angle of the light emitting surface 122 of optical fiber 121 in degrees. The y-axis represents the brightness of the light rays emitted from the light emitting surface 122 of the optical fiber 121 in units of nit. The solid line indicates the light rays emitted from the light emitting surface 122 of the optical fiber 121 in the X-direction, and the dashed line indicates the light rays emitted from the light emitting surface 122 of the optical fiber 121 in the Z-direction.

In the simulation, θ is defined as 5 degrees so as to ensure that enough light rays have emitted from the light emitting surface 122 of the optical fiber 121. The slope 1214 and the light emitting surface 122 of the optical fiber 121 form an intersecting line. Preferably, the distance (b) between the intersecting line and the horizontal plane 127 equals to 0.3 mm. It can be understood that the horizontal plane 127 is only defined for illustration.

As shown in FIG. 4, the light emitting angle of the light rays emitted from the light emitting surface 122 of the optical fiber 121 is enlarged to be 110 degrees in the Z-direction, but the light emitting angle in the X-direction is similar.

FIG. 5a is a schematic view showing another shaped optical fibers in accordance with one embodiment. FIG. 5b is a right view of the shaped optical fibers of FIG. 5a. As shown in FIG. 5a, the optical fiber 121 is cut or fused-biconical-tapered so as to form a truncated conical-shaped light emitting end. Preferably, two lateral surfaces 1216 are symmetrical to each other with respect to the central axis of the optical fiber 121. As shown in FIG. 5b, the light emitting surface 123 of the optical fiber 121 is circular.

In addition, the light emitting angle of the light emitting surface 123 of the optical fiber 121 satisfies the equation below.

$$\beta = (2n+1)\theta + \alpha;$$

wherein β indicates the light emitting angle of the light emitting surface 123 of the optical fiber 121, θ indicates the angle between the lateral surfaces 1216 and the horizontal plane 127 of the optical fiber 121, α indicates the angle between the lateral surfaces 1216 and the direction of an incidence light ray upon the truncated conical-shaped light emitting end, and n indicates the number of perfect reflection of the incidence light ray upon the lateral surface 1216.

Figure 6:
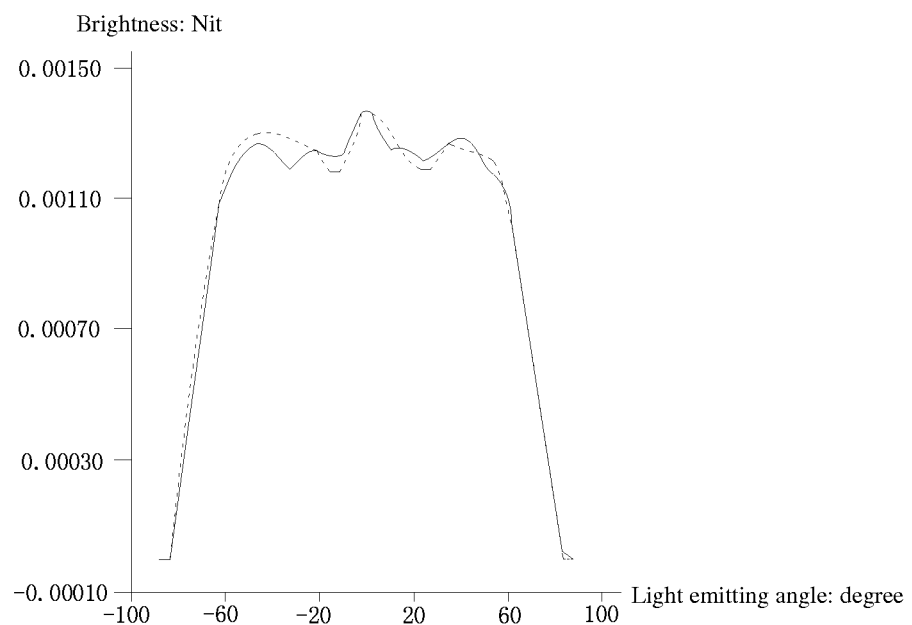

The shaped optical fiber 121 of FIG. 5a is also simulated by the LightTools to confirm whether the light emitting angle of the light rays emitted from the light emitting surface 123 is enlarged. As stated above, the light rays with the wavelength of the range between 380 nm to 760 nm enter the optical fiber 121. The diameter of the core 1211 is 1 mm, the reflective rate of the core 1211 ($n_o$) equals to 1.467, and the reflective rate of the clad layer 1212 ($n_c$) equals to 1.419. In FIG. 6, the x-axis represents the light emitting angle of the light emitting surface 122 of optical fiber 121 in degrees. The y-axis represents the brightness of the light rays emitted from the light emitting surface 123 of the optical fiber 121 in units of nit. The solid line indicates the light rays emitted from the light emitting surface 123 of the optical fiber 121 in the X-direction, and the dashed line indicates the light rays emitted from the light emitting surface 122 of the optical fiber 121 in the Z-direction.

In the simulation, θ is defined as 5 degrees so as to ensure that enough light rays have emitted from the light emitting surface 123 of the optical fiber 121. The slope 1214 and the light emitting surface 122 of the optical fiber 121 form the intersecting line. Preferably, the distance (b) between the intersecting line and the horizontal plane 127 equals to 0.3 mm. It can be understood that the horizontal plane 127 is only defined for illustration.

Comparing FIG. 6 with FIG. 2, the light emitting angle of the light rays from the light emitting surface 123 of the optical fiber 121 is enlarged to be 135 degrees in the Z-direction, and the light emitting angle in the X-direction is also enlarged to be 135 degrees.

Figure 7A:
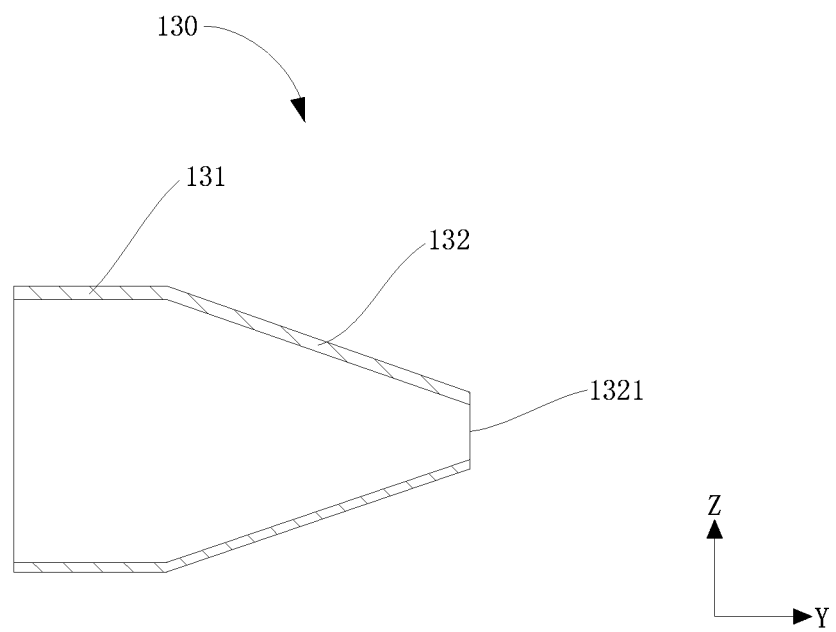
Figure 7B:
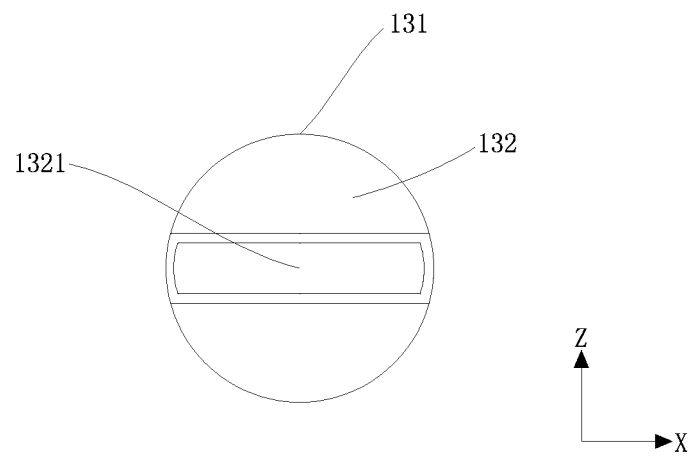
Figure 9A:
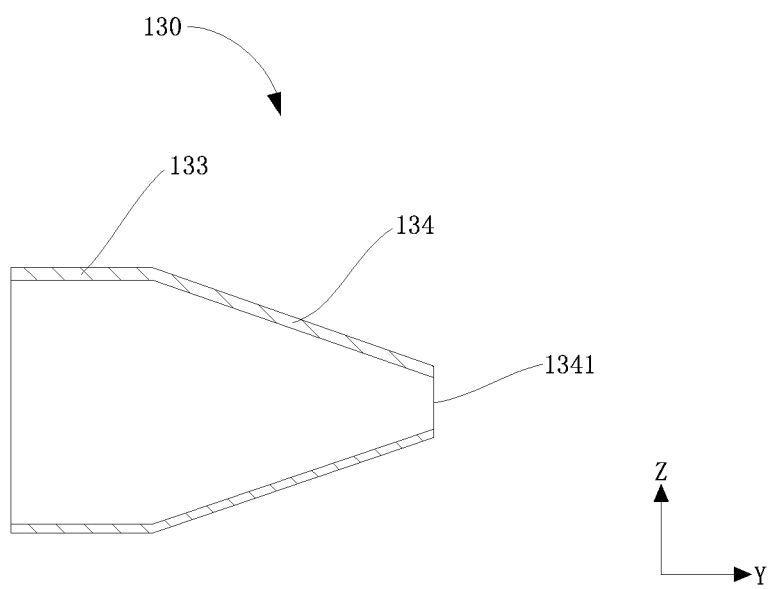
FIG. 9a is a schematic view showing the optical fiber sleeve engaging with the optical fiber of FIG. 5.
Figure 9B:
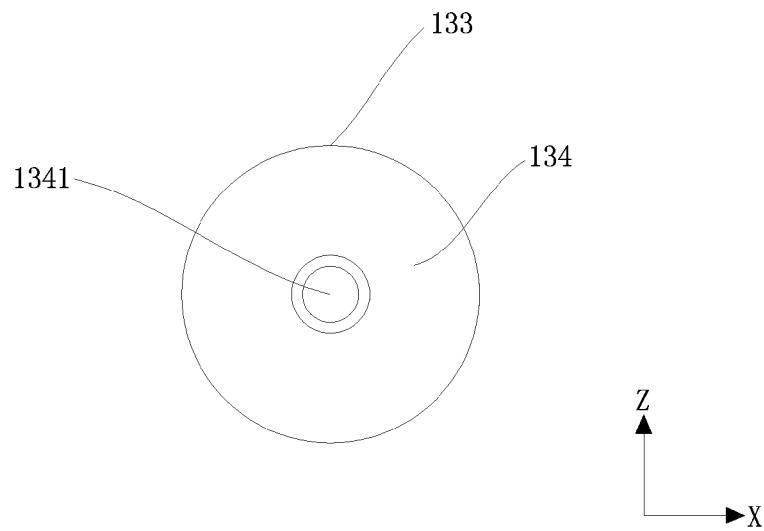

As the optical fiber 121 is cut and shaped, the light emitting end of the optical fiber 121 only includes a portion of the naked core 1211, which is fragile. In order to prevent the naked core 1211 from being damaged, the optical fiber sleeve is configured to engaged with the naked core 1211. FIGS. 7a and 7b show the optical fiber sleeve for the wedge-shaped light emitting end of FIG. 3a. FIGS. 9a and 9b show the optical fiber sleeve for the truncated conical-shaped light emitting end of FIG. 5a.

As shown in FIG. 7a, the optical fiber sleeve 130 includes a sleeve portion 131 and an engaging portion 132. The internal diameter of the engaging portion 132 gradually decreases along the direction from a connecting portion of the sleeve portion 131 and the engaging portion 132 toward an outlet 1321 of the engaging portion 132. As shown in FIG. 7b, the outlet 1321 of the engaging portion 132 is quasi-rectangular-shaped, and two short sides of the outlet 1321 are arc-shaped.

Figure 8:
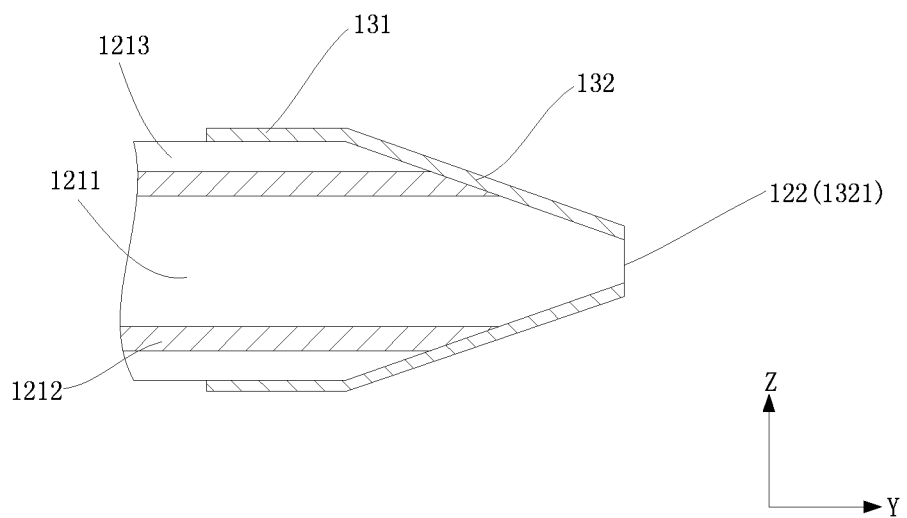

FIG. 8 is an assembled view of the optical fiber sleeve of FIG. 7a and the shaped optical fiber of FIG. 3a.

As shown in FIG. 8, the internal diameter of the sleeve portion 131 is the same with the diameter of the optical fiber 121. The inner contour of the engaging portion 132 is corresponding to the contour of the wedge-shaped light emitting end of the optical fiber 121. As such, the wedge-shaped light emitting end closely engages with the engaging portion 132. Preferably, the wedge-shaped light emitting end aligns with the outlet 1321 such that the rays are emitted from the light emitting surface 123 at a maximum light emitting angle. In addition, the sleeve portion 131 engages with the wedge-shaped light emitting end above the coating layer 1213 to protect the core 1211 from being damaged. In addition, the engaging portion 132 is attached on the coating layer 1213, which is close to the wedge-shaped light emitting end, by adhesive or screw.

As shown in FIG. 9a, the optical fiber sleeve 130 includes the sleeve portion 133 and the engaging portion 134. The internal diameter of the engaging portion 134 gradually decreases along the direction from the connecting portion of the sleeve portion 133 and the engaging portion 134 toward an outlet 1341 of the engaging portion 134. As shown in FIG. 9b, the outlet 1341 of the engaging portion 134 is circular.

Figure 10:
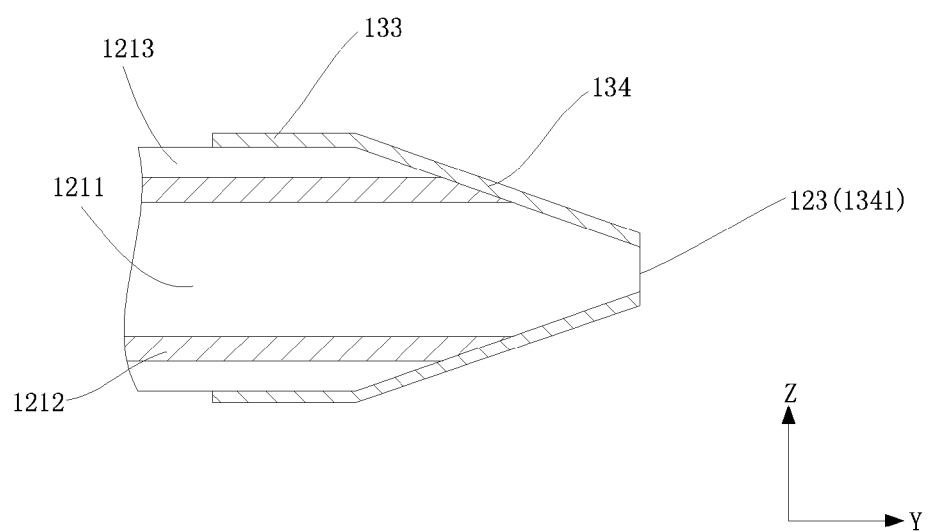

FIG. 10 is an assembled view of the fiber sleeve of FIG. 9a and the shaped optical fiber of FIG. 5a.

As shown in FIG. 10, the internal diameter of the sleeve portion 133 is the same with the diameter of the optical fiber 121. The inner contour of the engaging portion 134 is corresponding to the contour of the truncated conical-shaped light emitting end of the optical fiber 121. As such, the truncated conical-shaped light emitting end closely engages with the engaging portion 134. Preferably, the truncated conical-shaped light emitting end aligns with the outlet 1341. In addition, the sleeve portion 133 engages with the truncated conical-shaped light emitting end above the coating layer 1213 to protect the core 1211 from being damaged. In addition, the engaging portion 134 is attached on the coating layer 1213, which is close to the wedge-shaped light emitting end, by adhesive or screw.

Figure 11:
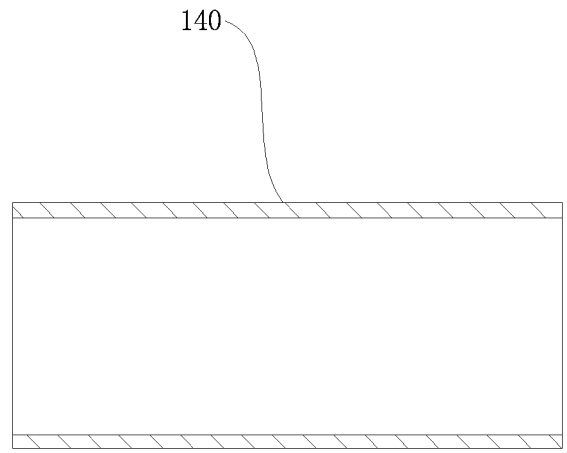
FIG. 11 is a schematic view of the fixing sleeve in accordance with one embodiment.

FIG. 11 is a schematic view of the fixing sleeve in accordance with one embodiment. The optical fiber sleeve of FIG. 7a and the wedge-shaped light emitting end of FIG. 3a are taken as examples to describe other components hereinafter. As shown in FIG. 11, the fixing sleeve 140 engages with the sleeve portion 131 of the optical fiber sleeve 130. Preferably, the internal diameter of the fixing sleeve 140 equals to the diameter of the sleeve portion 131. An inner surface of the fixing sleeve 140 includes internal thread, and an outer surface of the sleeve portion 131 includes outside thread. The fixing sleeve 140 engages with the sleeve portion 131 by the internal thread and the outside thread. The optical fiber sleeve 130 is made by rigid plastic or metallic material. Preferably, the optical fiber sleeve 130 is made by rigid plastic material, such as polyurethane or epoxy, to prevent the optical fiber 121 from damage.

Figure 12:
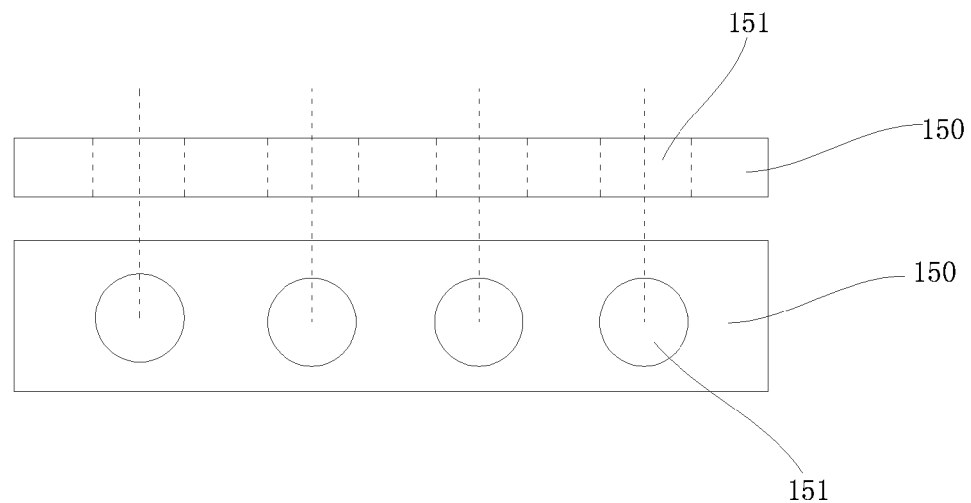
FIG. 12 is a schematic view of the light emitting plate in accordance with one embodiment.

FIG. 12 is a schematic view of the light emitting plate in accordance with one embodiment. The up portion of FIG. 12 shows a side view of the light emitting plate, and the down portion of FIG. 12 shows a front view of the light emitting plate.

The light emitting plate 150 is rectangular-shaped and includes a plurality of through holes 151. The fixing sleeve 140 is received within the through hole 151. The diameter of the fixing sleeve 140 is the same with that of the through hole 151. Preferably, the fixing sleeve 140 engages with the through hole 151 by welding or by adhesive.

Figure 13:
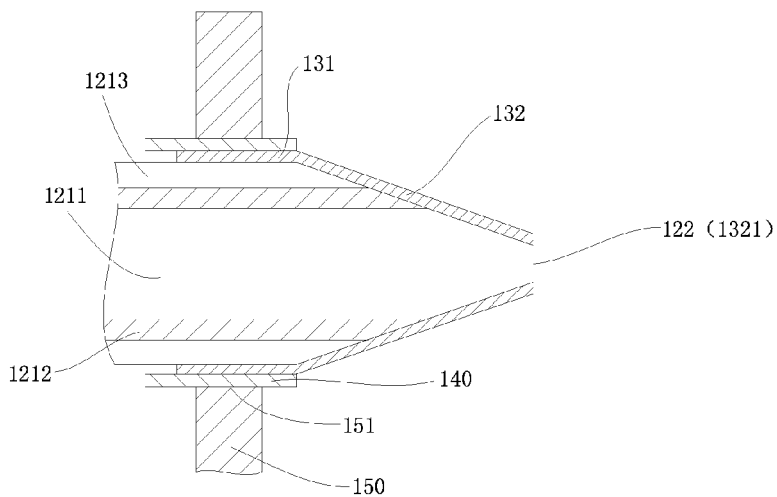
FIG. 13 is an assembled view of the fixing sleeve, the light emitting plate, and the optical fiber in accordance with one embodiment.

FIG. 13 is an assembled view of the fixing sleeve, the light emitting plate, and the optical fiber in accordance with one embodiment.

As shown, the fixing sleeve 140 is fixed within the through hole 151. The sleeve portion 131 of the optical fiber sleeve 130 is fixed within the fixing sleeve 140. The wedge-shaped light emitting end of the optical fiber 121 and the coating layer 1213 close to the wedge-shaped light emitting end are fixed within the optical fiber sleeve 130.

Figure 14:
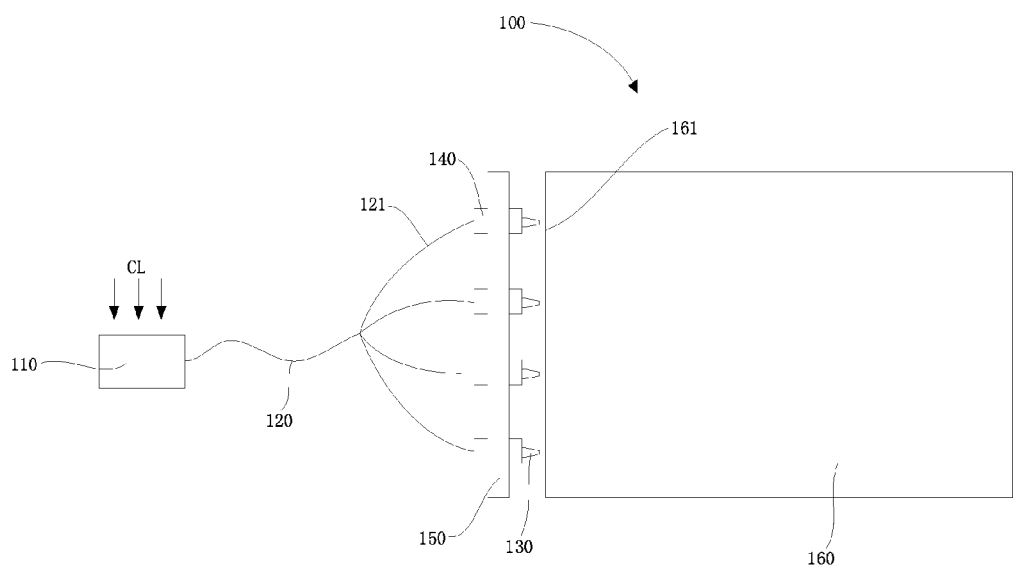
FIG. 14 is a schematic view of a backlight module in accordance with one embodiment.

FIG. 14 is a schematic view of a backlight module in accordance with one embodiment.

As shown, the backlight module 100 includes an optical plate 160, and the light emitting plate 150 arranged at a lateral side 161 of the optical plate 160. A plurality of fixing sleeves 140 respectively fixed within the through holes 151 of the light emitting plate 150. The wedge-shaped light emitting end of the optical fiber 121 respectively engages with the optical fiber sleeves 130. The optical fiber sleeves 130 are fixed within the fixing sleeves. The ambient light collector 110 collects the ambient light, such as the sunlight rays or indoor light rays, for providing to a plurality of optical fibers 121. The lights are then emitted out from the light emitting surface 123 of the wedge-shaped light emitting end of the optical fiber 121 to ensure a maximum light emitting angle.

In one embodiment, the optical fibers 121 may be bundled by a crust to be a fiber bundle 120. One end of the fiber bundle 120 connects to the ambient light collector 110, and the independent optical fiber 121 connects to the light emitting plate 150.

In one embodiment, the optical plate 160 is a light guiding plate made by PMMA. The backlight module 100 is an edge-type backlight module. In other embodiments, when the light emitting plate 150 is arranged close to a bottom of the optical plate 160, the optical plate 160 is a diffusion plate and the backlight module 100 is a direct-lit backlight module.

Figure 15:
FIG. 15 is a schematic view of a liquid crystal display in accordance with one embodiment.

FIG. 15 is a schematic view of a liquid crystal display in accordance with one embodiment.

As shown, the liquid crystal display includes the backlight module 100 and a liquid crystal panel 200 opposite to the backlight module 100. The backlight module 100 supplies light rays to the liquid crystal panel 200 so that the liquid crystal panel 200 can display images.

In view of the above, the backlight module and the liquid crystal display utilize the ambient light as light source. In addition, by cutting the light emitting end of the optical fibers, the light emitting angle of the light rays are greatly enlarged. As such, the brightness difference is decreased and the display performance is enhanced.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A backlight module, comprising:
an ambient light collector for collecting ambient lights;
at least one optical fiber connecting to the ambient light collector, the optical fiber comprises a core, a clad layer, and a coating layer, the coating layer is a polymer coating layer, and light emitting ends of the optical fiber are cut to enlarge light emitting angles, wherein the light emitting end of the optical fiber is substantially wedge-shaped or truncated conical-shape, wherein the light emitting end comprises two slopes symmetric to each other with respect to a central axis of the optical fiber, and two short sides of the light emitting surface are arc-shaped;
a light emitting plate arranged closely to an optical plate, and the light emitting plate comprises a plurality of through holes;
at least one fixing sleeve being received in the through hole; and
at least one optical fiber sleeve being fixed within the fixing sleeve and engaging with the light emitting ends of the optical fibers so as to fix the optical fibers on the light emitting plate, wherein the optical fiber sleeve comprises a sleeve portion and an engaging portion, an internal diameter of the engaging portion gradually decreases along a direction from a connecting portion of the sleeve portion and the engaging portion toward an outlet of the engaging portion; and
the light emitting angle of the light emitting surface of the optical fiber satisfying the equation:

$$\beta=(2n+1)\theta+\alpha;$$

wherein β indicates the light emitting angle of the light emitting surface of the optical fiber, θ indicates the angle between the slope with respect to the central axis of the optical fiber and a horizontal plane of the optical fiber, α indicates the angle between the slope and a direction of a light ray from an internal direction of the optical fiber upon the light emitting end, and n indicates a number of perfect reflections of the light ray upon the slope.

2. The backlight module as claimed in claim 1, wherein an outer wall of the fixing sleeve engages with the through holes by welding.

3. The backlight module as claimed in claim 1, wherein an outer wall of the fixing sleeve engages with the through holes by adhesive.

4. The backlight module as claimed in claim 1, wherein an internal diameter of the sleeve portion is the same with the diameter of the optical fiber, the engaging portion engages with the light emitting end of the optical fiber, and the sleeve portion is attached on the optical fibers.

5. The backlight module as claimed in claim 4, wherein the sleeve portion is attached on the optical fibers by adhesive.

6. The backlight module as claimed in claim 1, wherein an inner surface of the fixing sleeve comprises internal thread, and an outer surface of the sleeve portion comprises outside thread, the fixing sleeve engages with the sleeve portion by the internal thread and the outside thread so as to fix the fixing sleeve and the sleeve portion of the optical fiber sleeve.

7. The backlight module as claimed in claim 1, wherein the optical plate is a light guiding plate.

8. The backlight module as claimed in claim 1, wherein the optical plate is a diffusion plate.

9. A liquid crystal display, comprising:
a backlight module and a liquid crystal panel opposite to the backlight module, the backlight module provides a light source to the liquid crystal panel, and the backlight module comprises:
an ambient light collector for collecting ambient lights;
at least one optical fiber connecting to the ambient light collector, the optical fiber comprises a core, a clad layer, and a coating layer, the coating layer is a polymer coating layer, and light emitting ends of the optical fiber are cut to enlarge light emitting angles, wherein the light emitting end of the optical fiber is substantially wedge-shaped or truncated conical-shape, wherein the light emitting end comprises two slopes symmetric to each other with respect to a central axis of the optical fiber, and two short sides of the light emitting surface are arc-shaped;

a light emitting plate arranged closely to an optical plate, and the light emitting plate comprises a plurality of through holes;

at least one fixing sleeve being received in the through hole; and at least one optical fiber sleeve being fixed within the fixing sleeve and engaging with the light emitting ends of the optical fibers so as to fix the optical fibers on the light emitting plate, wherein the optical fiber sleeve comprises a sleeve portion and an engaging portion, an internal diameter of the engaging portion gradually decreases along a direction from a connecting portion of the sleeve portion and the engaging portion toward an outlet of the engaging portion; and the light emitting angle of the light emitting surface of the optical fiber satisfying the equation:

$$\beta=(2n+1)\theta+\alpha;$$

wherein $\beta$ indicates the light emitting angle of the light emitting surface of the optical fiber, $\theta$ indicates the angle between the slope with respect to the central axis of the optical fiber and a horizontal plane of the optical fiber, $\alpha$ indicates the angle between the slope and a direction of a light ray from an internal direction of the optical fiber upon the light emitting end, and n indicates a number of perfect reflections of the light ray upon the slope.

10. The liquid crystal display as claimed in claim 9, wherein an outer wall of the fixing sleeve engages with the through holes by welding.

11. The liquid crystal display as claimed in claim 9, wherein an outer wall of the fixing sleeve engages with the through holes by adhesive.

12. The liquid crystal display as claimed in claim 9, wherein an internal diameter of the sleeve portion is the same with the diameter of the optical fiber, the engaging portion engages with the light emitting end of the optical fiber, and the sleeve portion is attached on the optical fibers.

13. The liquid crystal display as claimed in claim 12, wherein the sleeve portion is attached on the optical fibers by adhesive.

14. The liquid crystal display as claimed in claim 9, wherein an inner surface of the fixing sleeve comprises internal thread, and an outer surface of the sleeve portion comprises outside thread, the fixing sleeve engages with the sleeve portion by the internal thread and the outside thread so as to fix the fixing sleeve and the sleeve portion of the optical fiber sleeve.

15. The liquid crystal display as claimed in claim 9, wherein the optical plate is a light guiding plate.

16. The liquid crystal display as claimed in claim 9, wherein the optical plate is a diffusion plate.

* * * * *